April 27, 1926.
O. W. CALDWELL ET AL
1,582,573
COMBINATION SCIENCE TABLE AND CLASS ROOM DESK
Filed May 26, 1924
5 Sheets-Sheet 1
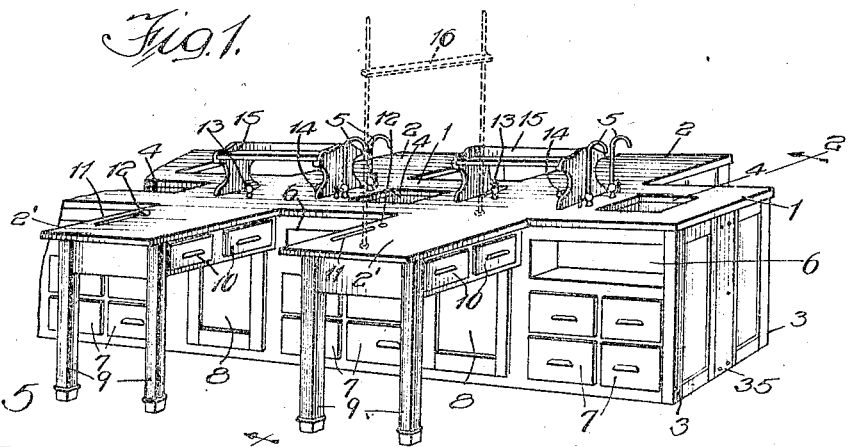
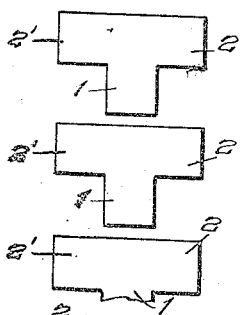
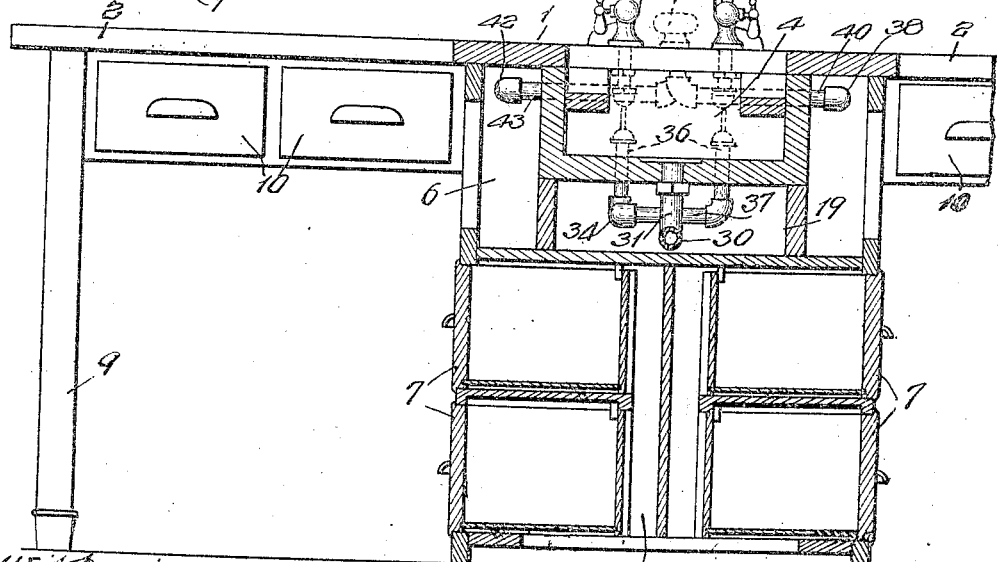
Witnesses:
Inventors:
Otis W. Caldwell,
Earl R. Glenn,

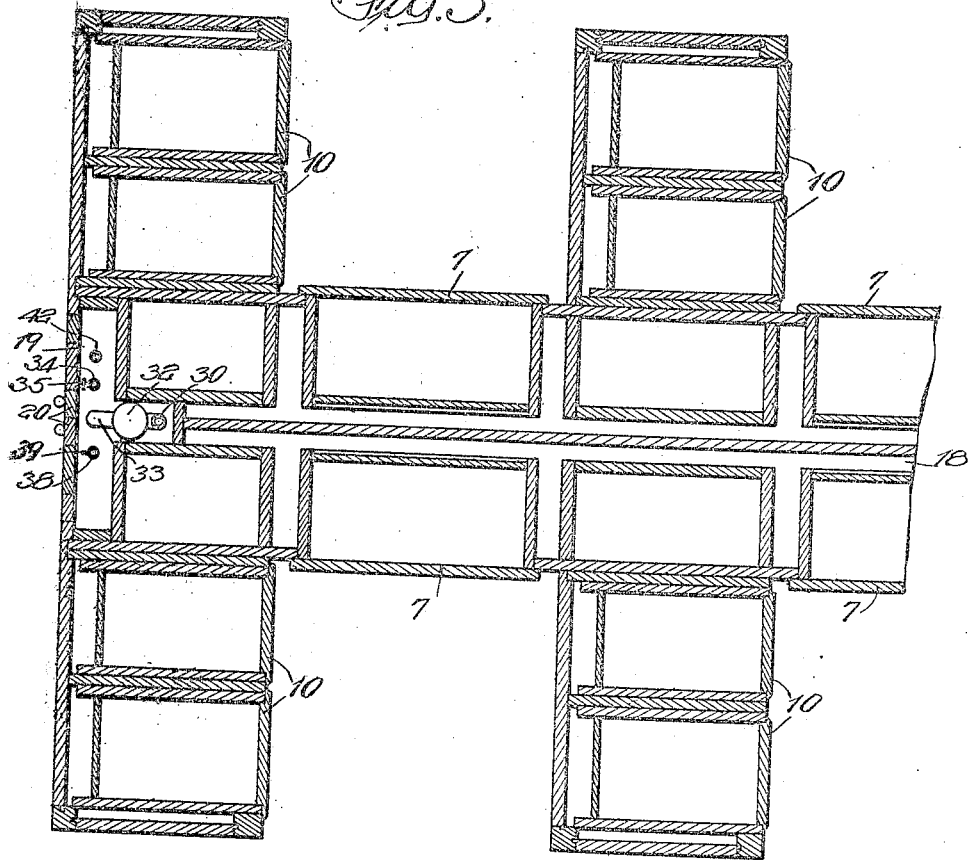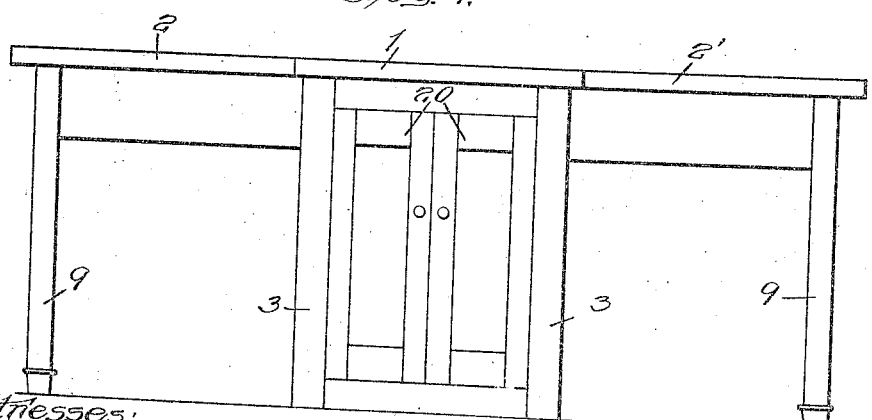

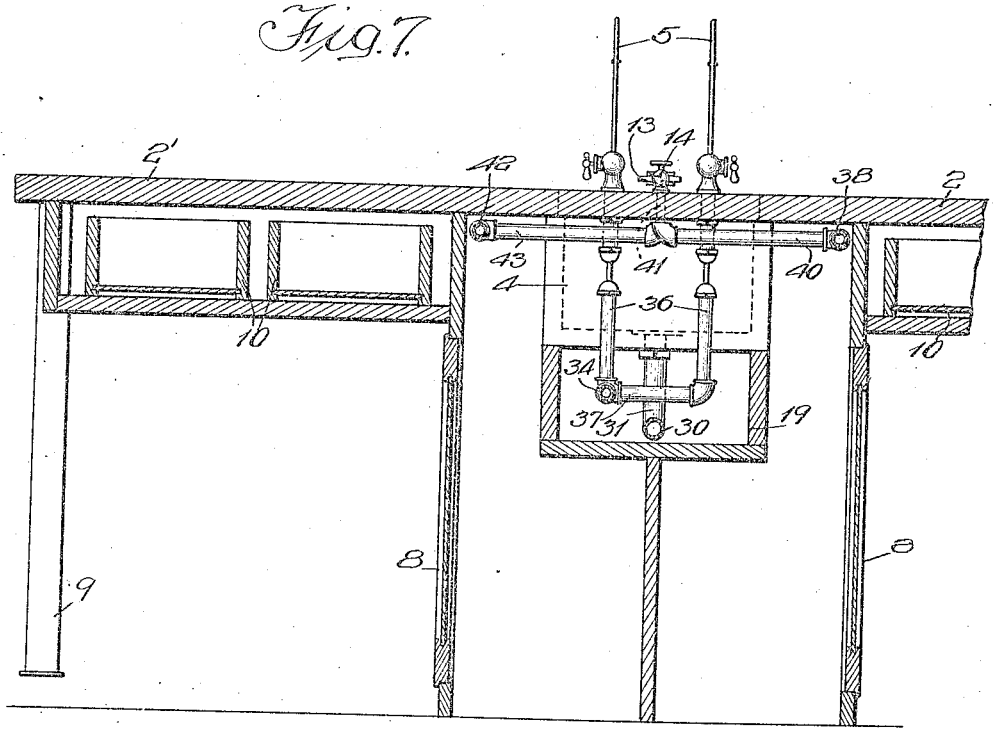
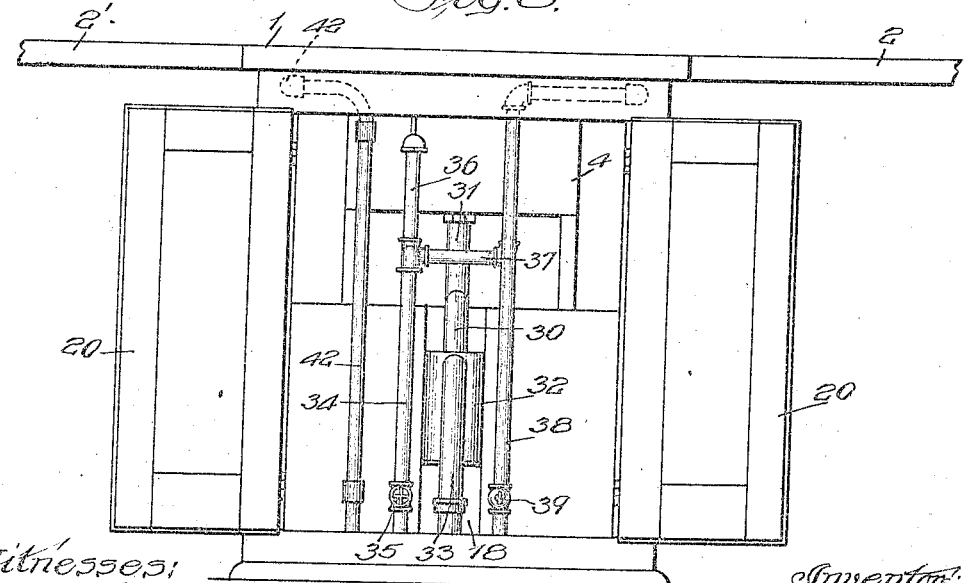

April 27, 1926. 1,582,573
O. W. CALDWELL ET AL
COMBINATION SCIENCE TABLE AND CLASS ROOM DESK
Filed May 26, 1924   5 Sheets-Sheet 4
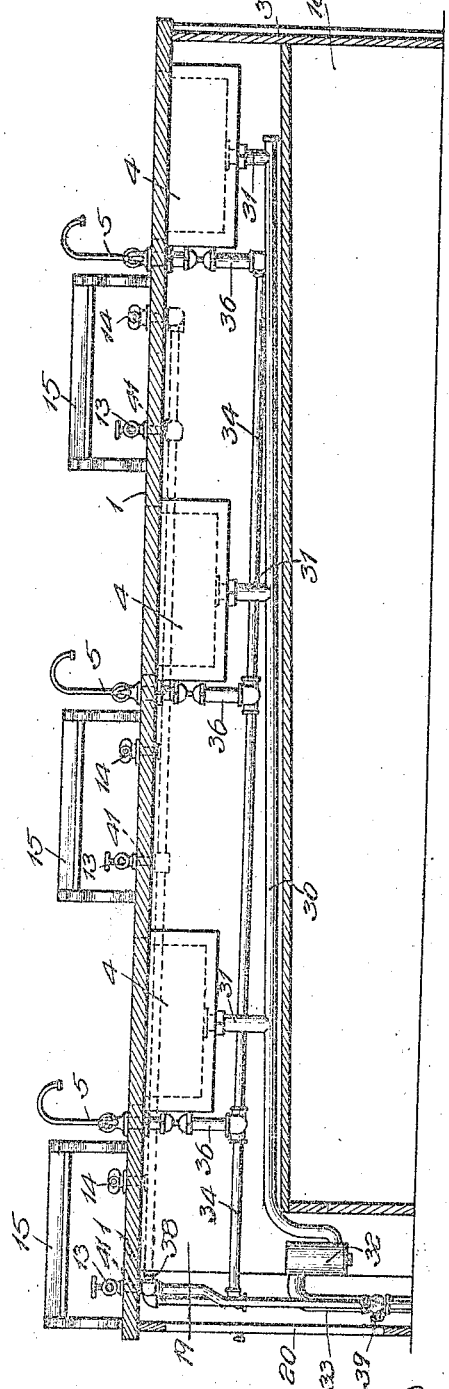

April 27, 1926.  
O. W. CALDWELL ET AL  
1,582,573  
COMBINATION SCIENCE TABLE AND CLASS ROOM DESK  
Filed May 26, 1924  5 Sheets-Sheet 5
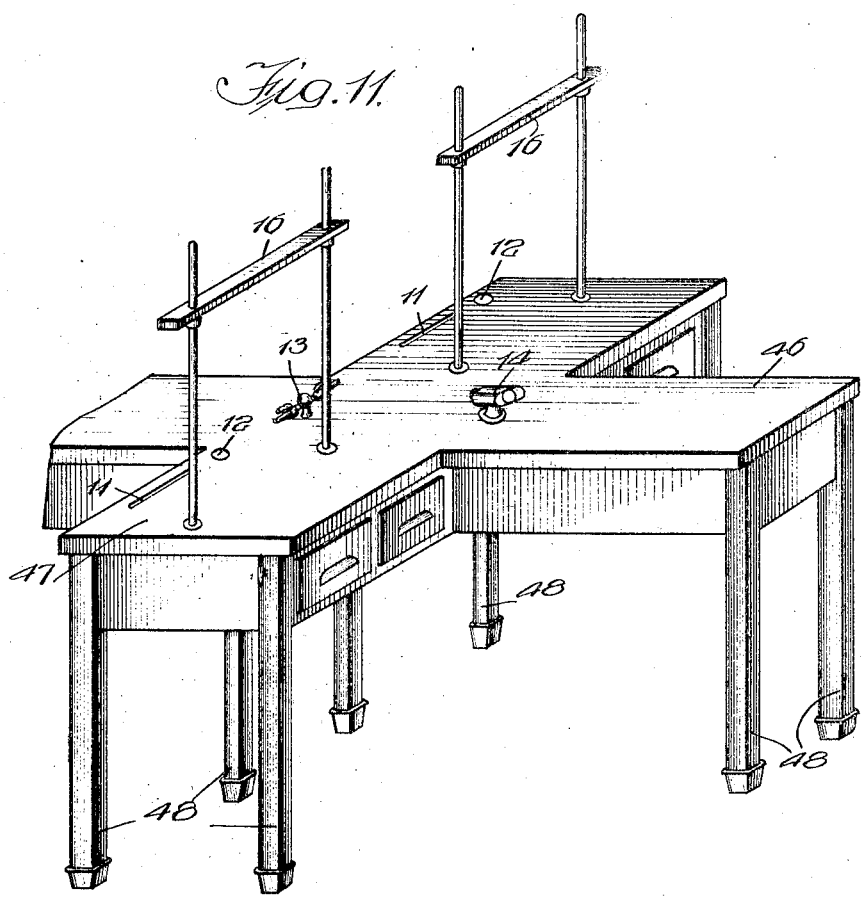
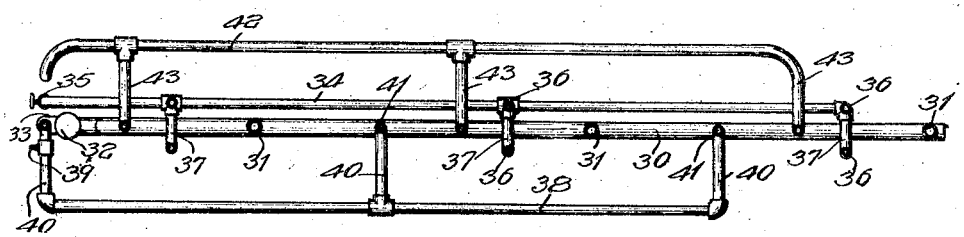

Patented Apr. 27, 1926.

1,582,573

UNITED STATES PATENT OFFICE.

OTIS W. CALDWELL AND EARL R. GLENN, OF NEW YORK, N. Y., ASSIGNORS TO KEWAUNEE MFG. CO., OF KEWAUNEE, WISCONSIN, A CORPORATION OF WISCONSIN.

COMBINATION SCIENCE TABLE AND CLASSROOM DESK.

Application filed May 26, 1924. Serial No 715,936.

*To all whom it may concern:*

Be it known that we, OTIS W. CALDWELL and EARL R. GLENN, citizens of the United States, residing at New York, in the county of New York and State of New York, have invented certain new and useful Improvements in Combination Science Tables and Classroom Desks, of which the following is a description.

Our invention belongs to that general class of devices known as laboratory apparatus and more particularly to a science laboratory or class room table or desk particularly adapted for school, college and university purposes, but which may be employed wherever found applicable in educational and industrial institutions.

The invention has among its objects the production of a combination table of the kind described which is simple, convenient, compact, durable, attractive and efficient. It has particularly as an object the production of a table adapted for use in physics, chemistry, biology, general science and agricultural laboratories for both laboratory and recitation periods, and to enable use of laboratory as a class room by non-science students, or in industrial institutions where it is desired that the workers have certain conveniences or apparatus in common and some individually.

While the installation is economical, the chief merits of the invention are in its advantages for educational use, which may be briefly stated as follows:

All the science work can be done by the student in one room and in one place. Students face the instructor all the time. Provides adequately for comfortable work in a standing or sitting position, thus making it possible for the students to write up notes, make drawings, do reference reading, perform laboratory experiments or observe demonstrations by instructor. Also permits instructor to give demonstrations, quizzes, direct reference work and hold class discussions in the same room at any time during the science period, thus eliminating fixed laboratory and demonstration schedules. Apparatus is stored where used. Provides individual storage spaces for students. The instructor can see the entire class at work from any location, and his labor is reduced by concentrating all tools, materials and equipment in a much smaller floor space than is usual in the design requiring separate class room or lecture room and laboratory. It permits the laboratory to be used as a class room by non-science classes.

Many other objects and advantages of the construction herein shown and described will be obvious to those skilled in the art from the disclosures herein given.

To this end our invention consists in the novel construction, arrangement and combination of parts herein shown and described, and more particularly pointed out in the claims.

In the drawings, wherein like reference characters indicate like or corresponding parts:

Fig. 1 is a perspective view showing one type of table which can be used for physics and chemistry;

Fig. 2 is a sectional view taken substantially on line 2—2 of Fig. 1, a portion broken away;

Fig. 3 is a horizontal sectional view;

Fig. 4 is an end elevation;

Fig. 5 illustrates a diagrammatical and sectional unit construction; and

Fig. 6 is a perspective view illustrating one type of interconnection between the sectional units.

Fig. 7 is a cross sectional view similar to Fig. 2 taken at another point;

Fig. 8 is an end elevation of a portion of the construction illustrating a suitable arrangement of the plumbing, etc., Fig. 9 is a sectional view taken lengthwise through the table illustrating the plumbing, etc., Fig. 10 is a sectional view illustrating the top elevation of the plumbing in the tunnel;

Fig. 11 is a perspective view illustrating a modified type of table;

Fig. 12 is a digrammatic view illustrating one type of unit construction;

Fig. 13 is a similar view illustrating another type;

Fig. 14 is a similar view illustrating another type; and

Fig. 15 is a similar view illustrating still another type.

Referring to the drawings, in which a table particularly adapted for chemistry or like laboratory work is illustrated, we have shown in Fig. 1 a portion of a plurality of units. The particular table illustrated consists of what may be termed a central portion 1, adapted to be used in common by two students, and portions 2 and 2', adapted to be used individually by the two students working on opposite sides of portion 1. Generally speaking, the table is made up of a central portion with tables extending from both sides at intervals, the length depending upon the number of students to be accommodated.

The central portion 1 we generally prefer to make in the form of a cabinet 3, provided with a sink 4 with the usual water supply 5. This cabinet may be provided with suitable drawers or compartments for the storage of equipment and the personal effects of the student, the particular table shown having a recess 6 and drawers 7, as well as a compartment closed by the door 8. The recess 6 may be provided with a drop door and the recess employed for any desired storage. For example, a tray may be employed on top of the bottle rack and made of suitable material so that the bottles can be lifted off the rack and with one movement placed in the recess.

The table parts 2 and 2' are shown with legs 9 and with individual drawers 10, and while the lower portion may be enclosed to form a cabinet, the construction shown or one similar thereto is preferred, as the student can sit down and use the same as a desk and work comfortably and conveniently. This part is shown for convenience with a pen tray 11 and inkwell 12, and there may also be provided between the two tables, or at some convenient point, gas connections 13 and electrical connections 14, together with such other conveniences or generally permanent apparatus as desired. Where the table is used for chemistry purposes, there is usually provided a rack 15 upon which may be placed the usual bottles containing the necessary reagents. As before mentioned, the bottles may be placed on a tray in the recess 6, and the tray containing the bottles be removed from the recess and placed on the rack 15. It may be mentioned, however, that when the desk is used for other purposes, part 15 may be omitted and such other equipment substituted as may be required. For example, where the desk is to be used in a physics laboratory there is usually provided the standard 16, which may be permanently or removably secured in place.

We prefer to construct the table so that in the central portion there is provided what may be termed a tunnel 18, in which may be placed the water and sewer pipes, gas pipes, electrical wiring, etc., and in this case we prefer to extend the same from one end to the other, providing a chamber 19 at the end normally closed by doors 20 or the equivalent. In chamber 19 all connections with the sewer, water, gas, electricity, etc., are made with the building system so that it is necessary to have only in the laboratory to have only one set of mains coming out of the floor for each complete table, thereby reducing the expense of installation. This avoids bringing up various outlets at different points in the floor, as required by the types of tables now in use, when these are installed in correct relation to windows of room. The pipes in the tables being accessible, also helps to keep down the maintenance cost. Most of the piping being in the table above the floor, reduces the danger of damage which usually is done when the pipes are laid under the floors and begin to leak. One arrangement of the utilities is more fully described hereinafter in detail.

The table is substantially made up of a plurality of T-shaped units, it being immaterial as to whether the units are permanently built together or the units separately built and the sections secured together.

In Fig. 5 we have illustrated substantially diagrammatically a plurality of T-shaped units which may be secured together to form a unitary construction substantially as shown in Fig. 1. When the desk is made up in this manner, one unit may be provided with a closed end at the portion 1, while another unit may be provided with a closed end, as indicated in Fig. 4, the intermediate units generally left open, if desired, so as to provide a continuous tunnel through the connected tables. These units may be secured together in any suitable manner, as for instance, by bolts, screws or the like, or they may be secured so as to be readily assembled without bolts. For example, in Fig. 6 a very simple construction is shown in which a strap 25 is placed on one unit and a cooperating strap on the other, the two being connected together by a pin 27. This is merely illustrative of one type of the many possible fastening means that can be employed for the purpose.

We have illustrated, particularly in Figs. 7, 8, 9 and 10, an arrangement of the utilities, for example, plumbing, wiring, etc., it being understood, however, that the particular arrangement and utilities installed may be varied as found desirable. As shown, 30 illustrates the waste pipe which is connected with the sinks by the drain pipes 31, 32 representing a trap and 33 the connection to the sewer. The water mains or pipes 34 are connected with the supply main 35 representing a control valve arranged in the compartment 19. The particular table shown is provided with two single pantry cocks for cold water at each sink, and as shown, pipe 34 is connected with the same through the pipes 36 and 37. Obviously, such other water supply as desired, as for example hot water, may be supplied by the installation of suitable plumbing. The gas cocks 13 are supplied from a gas pipe 38, 39 representing a shut off valve and 40—41 the branches up to the gas cocks.

As shown, the gas is arranged at one side of the line of sinks, while on the opposite side is arranged the conduit 42—43 extending to the electrical connections 14. As before mentioned, these represent merely possible arrangements and installations as the same may be modified in almost innumerable ways, some utilities be omitted in some cases and other added in other cases. The same is intended as illustrative of how the plumbing and other systems may be installed in the desk or table, for example, at the factory, and then all connections made with the supply systems in the compartment 19, to which the building utilities may be extended. This also illustrates how access may be had to any of the utilities from the cabinet or compartment 19 so as to shut off the same, and makes possible not only a convenient and economical installation but also an attractive one. The end panel 35 may be removed also if necessary. Where we refer to utilities in the claims, we wish to be understood as including any and all equipment which may be found desirable to install in the device.

In Fig. 11, there is shown a simplified type of table embodying the important features of the table previously described in which 46 represents a table portion and 47 the side extensions, the same being supported by the legs 48, the cabinet portions down below omitted. Obviously, such number and style of drawers, etc., as suitable for the purpose for which the table is intended may be installed either before installation or any time thereafter. In the claims where we refer to the various portions as table, desk or cabinet portions, we wish to be understood as meaning that these terms may be used interchangeably, the same depending upon the particular type of table or desk constructed. For example, the sinks previously referred to might be applied to the portions 46 without there being any cabinet portion below as shown in Fig. 1. All of these accessory arrangements, utilities, etc., as they might be termed, depend upon the particular use for which the table is to be employed, whether science, biological, art, drawing, agricultural, industrial, etc.

In Fig. 12, we have illustrated diagrammatically another type of unit system in which 50 represents the individual table or desk portions and 51 the portions used in common. Fig. 13 illustrates still another type in which the portions 52 are provided with the side or individual units 53. Fig. 14 illustrates a central unit 54 provided with the side units 55, which may be arranged at one or both sides of the unit 54. Fig. 15 illustrates another type in which 56—57 is an L-shaped construction which may be made in units, and to which other units may be added, as for example, units similar to 53. These figures are intended to illustrate possible methods of construction, it being understood that when the unitary construction is employed the unit parts may be secured together and to adjacent units in any suitable manner for the purpose and modified arrangements made to fit particular installations. It may also be mentioned that one advantage of the structures shown in Fig. 14 is that the same is very convenient for shipping, inasmuch as the central unit may have the plumbing, etc., installed at the factory complete. This type may also be used very conveniently in the center of a room or away from the walls with units 55 on both sides, or against a side wall with units 55 on one side only. In any of these diagrammatic figures, we have not endeavored to show the sinks, fittings and accessories for, as before mentioned, these may depend upon the particular use for which the table is intended.

One advantage of the sectional unit construction is the convenience in shipping as well as in the ease with which complete tables of any desired number of units may be set up. In this connection it may be mentioned that table tops may also be made of a size to cover several units, thereby also securing the unit together as well as presenting an unbroken appearance.

It is likewise immaterial as to whether the particular arrangement of drawers or cupboards shown is followed in each instance, as in these details the desk may be made to comply with any special requirements for a given combination of subjects or studies. In using the desk, each student has a portion 1 in common with the student on the opposite side, and an individual desk 2' for his own work. Usually on desks of this kind each desk may be used at different periods by different classes, and by providing the drawers and cabinets, which are generally equipped with locks, a portion of the space may be used for general apparatus used by more than one student, while a portion of the space may be used by each individual student for his particular special apparatus, materials, books and personal effects. Of course, the drawers, compartments, etc., may be provided with locks and keys, master keys, etc.

The sink construction may be as desired, and the tops around the sinks may be made of stone or any other suitable material and connected with the wood tops of the cross members by means of feather joints or in any equivalent manner.

The design fills the need particularly of the small high schools and the consolidated schools, where the size of the classes and size of the building permit only one room to be devoted to the use of all the sciences. For such schools the above design is the ideal combination table, enabling students of different classes or sections at different periods of the day to perform experiments in chemistry, physics, biology, general sciences, or agriculture, as the case may be. The table with its modifications illustrated also solves the problem of providing individual science tables for the large modern high schools or colleges at a minimum expense. The students face one way, are separate and are each provided with all the working and storage facilities required according to modern laboratory practice. Where the science work of the entire school does not cover all the periods of the school day, the table can be used as a regular class room desk for mathematics and other subjects, thereby avoiding vacant rooms and cutting down the cost per room in new buildings.

Schools provided with this table in their science laboratories, need no separate science lecture room. The students always face the front of the room and the instructor's table or desk, and all of the lecture work and demonstration can be done in the respective laboratories. Furthermore, no definite periods need be set for lecture work or for laboratory work. The table permits the instructor to give a lecture, demonstrate or discuss any different phase of an experiment at any time during the laboratory period, and a lecture by the instructor can be stopped at any time and the students permitted to follow with individual laboratory experiments.

Usually we prefer to make the desk so as to accommodate six students at a time at the table, but regardless of the number of students accommodated at each table, that is the size of the table, each table will have but one set of outlets which may be placed near one end of the room instead of distributing numerous sets of pipes over the center of the room.

The design combines in its construction and equipment the facilities of an individual student's table, but is so constructed and equipped that the cost of installation and connecting up and the providing of building pipes for it is practically as low as for tables of the orthodox type now in use which are not individual and require from four to eight or more students to work aside of each other.

Having thus described our invention, it is obvious that various other immaterial modifications may be made in the same without departing from the spirit of our invention; hence we do not wish to be understood as limiting ourselves to the exact form, construction, arrangement and combination of parts herein shown and described or uses mentioned.

What we claim as new and desire to secure by Letters Patent is:

1. A laboratory table and class desk adapted for the use of a plurality of students, comprising separately formed sink and desk units, and means for securing certain units together to constitute a unitary structure of the whole having a line of sinks and oppositely extending desk portions extending laterally from said line of sinks and between adjacent pairs of sinks to provide spaces for students laterally of each sink and adjacent to the outer faces of the end desk portions and between the oppositely facing intermediate edge portions of the desks.

2. A laboratory table and class desk adapted for the use of a plurality of students comprising a unitary structure having a line of sinks and oppositely extending desk portions extending laterally from said line of sinks and between adjacent pairs of sinks to provide spaces for students laterally of each sink.

3. A laboratory table and class desk adapted for the use of a plurality of students comprising a unitary structure having a line of sinks and desk portions extending outwardly in a direction laterally of said line of sinks and between adjacent pairs of sinks to provide spaces for the students laterally of each sink.

4. A laboratory table and class desk adapted for the use of a plurality of students comprising a unitary structure having a line of sinks and desk portions extending outwardly in a direction laterally of said line of sinks and between adjacent pairs of sinks to provide spaces for the students laterally of each sink, and a common pipe line supplying water to the sinks.

5. A combined laboratory and recitation desk including an elongated central portion and a plurality of longitudinally spaced portions extending laterally from the longitudinal edge thereof to form longitudinally separated spaces opposite said longitudinal portion for a plurality of students, one extreme end of the central portion projecting beyond the adjacent laterally extending portion.

6. A laboratory table and class desk including an elongated central portion having a line of longitudinally spaced sinks therein, and a plurality of longitudinally spaced desk portions extending laterally from the longitudinal edge of said central portion to form longitudinally separated spaces opposite said longitudinal portion for a plurality of students, said student spaces being positioned relative to the sinks so that the sinks are within reach of the students.

7. A laboratory table and class desk including an elongated central portion having a line of longitudinally spaced sinks therein, and a plurality of longitudinally spaced desk portions extending laterally from the longitudinal edge of said central portion to form longitudinally separated spaces opposite said longitudinal portion for a plurality of students, said student spaces being positioned relative to the sinks so that the sinks are within reach of the students, and said central portion having a passage extending longitudinally thereof for the reception of utilities, the passage terminating at one end in a chamber for the outlets and connections.

In testimony whereof, we have hereunto signed our names.

OTIS W. CALDWELL.
EARL R. GLENN.